July 22, 1924.
H. K. SANDELL
MOTION PICTURE CAMERA
Original Filed Aug. 10, 1921
1,502,401
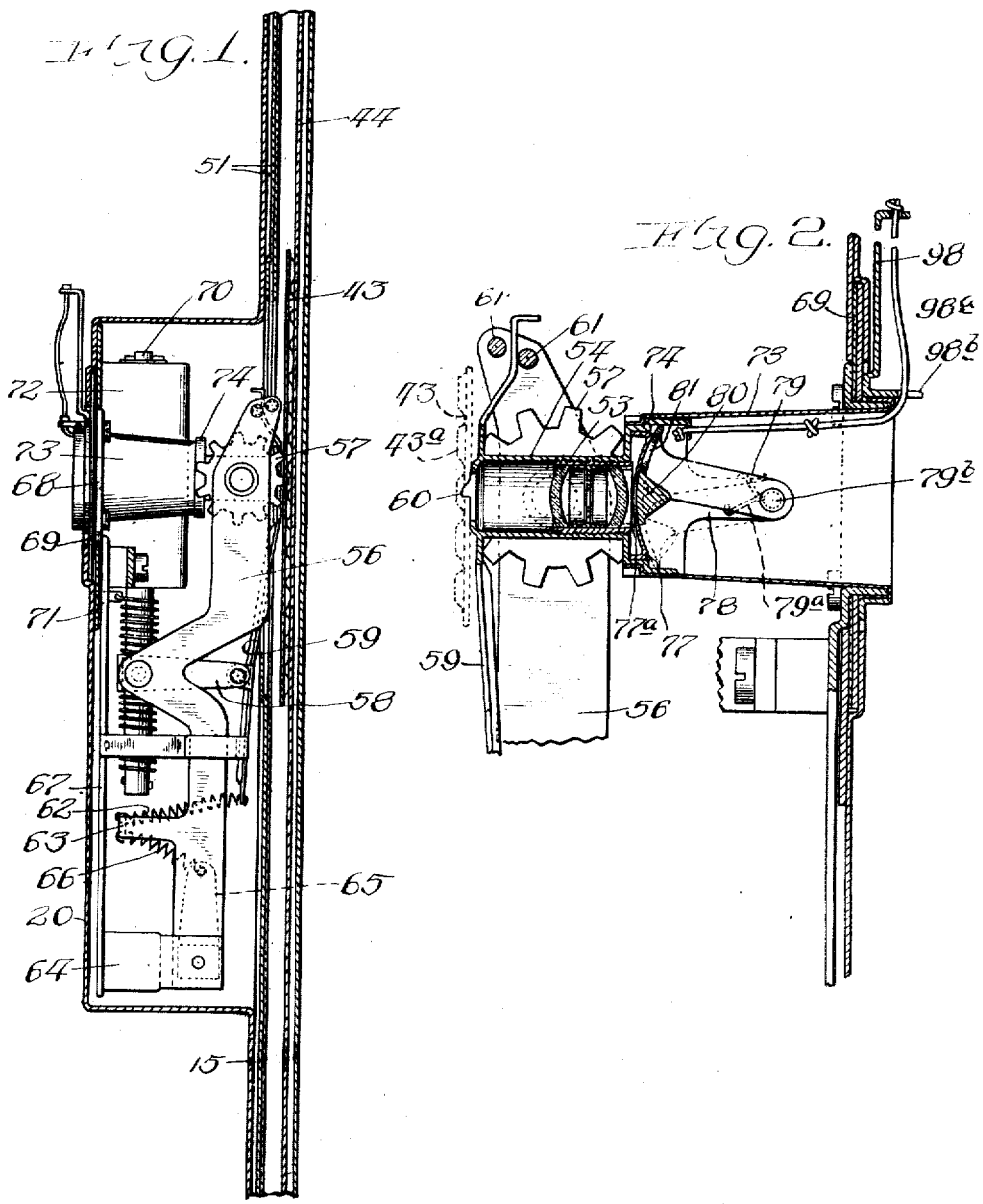

Patented July 22, 1924.

1,502,401

UNITED STATES PATENT OFFICE.

HENRY K. SANDELL, OF CHICAGO, ILLINOIS, ASSIGNOR TO MILLS NOVELTY COMPANY, OF CHICAGO, ILLINOIS, A CORPORATION OF ILLINOIS.

MOTION-PICTURE CAMERA.

Original application filed August 10, 1921, Serial No. 491,156. Divided and this application filed July 14, 1922. Serial No. 574,910.

*To all whom it may concern:*

Be it known that I, HENRY K. SANDELL, a citizen of the United States, residing at Chicago, in the county of Cook and State of Illinois, have invented a new and useful Improvement in Motion-Picture Cameras, of which the following is a specification.

The present invention relates to improvements in motion picture apparatus and more particularly to lens cell and shutter constructions in connection therewith. It will be fully understood from the following description, illustrated by the accompanying drawings, in which:

Fig. 1 is a broken vertical section through a part of a motion picture device showing on enlarged scale an objective and shutter mechanism in accordance with this invention; and Fig. 2 is a broken sectional view showing the arrangement of the lens cell in the camera.

Referring more particularly to the drawings, the numeral 15 indicates a large flat box or case, of sufficient size to permit the insertion of a holder containing a disk transparency or film upon which a spiral sequence of pictures may be photographed. Such a disk transparency may suitably have engaging members arranged in a spiral and in predetermined relation to each other, so that each engaging member will bear the same relative position to one of the series of pictures to be taken upon the transparency, as more fully described in my prior Patent No. 1,381,849, dated June 14, 1921. The construction of the casing is not a part of the present invention and is fully described in my prior application Serial No. 491,156, which has resulted in Patent No. 1,494,810 issued May 20, 1924, and of which this application is a division.

Upon the face of the box 15 is mounted a casing 20, which may suitably be a casting or of stamped metal, this casing containing the operating mechanism for the device.

The film disk 43 to be exposed in the camera is contained in a plate holder 44, which is supported in the camera and rotated by suitable operating mechanism (not shown). The front of the plate holder 44, said front being suitably double as shown at 51, is provided with a radial slot 52 through which exposures are made upon the film.

A spiral sequence of pictures (images) is exposed upon the film disk 43 by means of an objective or lens which travels slowly across the film as the latter is rotated. The film travels continuously and the objective is caused to travel with the film for the period of each exposure. This is suitably effected by the co-operation of the engaging members or projections 43$^a$ in the spiral groove of film 43, more fully described in the above-designated application, which co-operates with suitable engaging means operatively connected to the objective or objective support.

The objective 53 is mounted in a cylindrical casing or cell 54 which is carried by a pivoted arm 56, in the following manner. The pivoted arm 56 has secured to it a roller 57 which engages in the spiral groove in the disk or film 43, and its spacing from the film is thereby determined. A link 58 is pivotally mounted at one end on the arm 56 and to the other end of the link 58 is pivotally secured the bent arm 59 on which is mounted the cell or casing 54 containing the objective 53. The arm 59 is likewise provided with a pawl-like finger 60 which when properly positioned is engaged by the projections 43$^a$ in the spiral groove of the film 43, the objective opening being thus positioned over the film between the grooves. The adjacent end of the arm 59 is bent upwardly and passes between two pins 61, 61 mounted on arm 56. its position and movement being thereby in part determined. The other end of the arm 59 beyond the point at which it is pivoted to the link 58 is forced outwardly by means of the spring 62, one end of it is secured to the arm 59 and the other end to the lug 63 formed on the arm 56.

The arm 56 is pivotally mounted upon a standard 64. To this standard is rigidly secured a short arm 65 and coil spring 66 between the end of this arm and the lug 63 forces the arm 56 with the attached devices inwardly toward the film. The standard 64 is mounted upon a supporting bar 67 which in turn is rigidly secured at its end 68 to a steel curtain 69, the ends of which are secured to rollers 70 at opposite ends of a slot formed in the face of the casing 20. This slot corresponds in position to the slot 52 in the plate holder. The curtain 69 slides in grooves formed between the face of the casing 20 and a plate 71 secured to the underside thereof, a light proof covering for the slot being formed by the curtain. The rollers 70 upon which the ends of the curtain are mounted are protected by suitable hoods 72. The curtain 69 is provided with an opening opposite the lens 53 and a bellows 73 extends from the opening in the curtain to the enlarged end 74 of the cell 54 in which the lens is mounted. This bellows 73 prevents leakage of light, as will be readily apparent, and permits movement of the lens cell relative to the aperture in the curtain 69.

As the film or disk rotates, the lens follows the spiral grove, being held in proper relation to the area to be exposed by the roller 57 mounted on the arm 56. The pawl 60 on the lens carrying arm 59 is successively engaged by the projecting members 43ª formed in the spiral groove on the disk. These engaging members cause the arm 59 with the lens to move with the disk for a short space of time, during which exposure takes place. The pawl 60 is disengaged at the end of the forward movement of the lens by an outward movement of the arm 59 resulting from the curved end of that arm riding upon one of the pins 61 shown in Fig. 8. The link 58 permits the action just described, and also is so arranged that in this movement the lens is also moved slightly toward the film and tilted or inclined backward to compensate for the forward movement of the film and lens. When the pawl 60 is freed from engagement with the indentation in the disk, the lens-cell is retracted to its normal position by the spring 62. At the end of the return movement, the pawl 60 engages a fresh indentation, causing the lens-cell to come to a sudden stop, while the momentum of the shutter, which will be described presently, causes it to open to permit the exposure to be made, whereupon the shutter is again closed by its spring. It should be borne in mind, however, that the disk continues its rotation while the retraction of the lens-cell takes place and the lens-cell then moves forward again with the disk while the exposure occurs. In due time, however, the shutter-spring recovers and closes the shutter, which will now be described. In the enlarged end 74 of the cell 53 for the lens there is secured a cover member 77 having a cylindrical curvature, this cover member being provided with a suitable opening 77ª directly above the lens. The enlarged end 74 of the cell is likewise formed with a projecting tongue 78 to which is pivotally secured an arm 79 carrying a weighted shutter 80 provided with an opening 81. A spring 79ª coiled around the pivot 79ᵇ supporting the arm 79 engages the tongue 78 and the shutter 80 to hold the latter in position such that the opening 81 is completely out of alignment with the opening 78. The vibration of the cell 54 causes a vibration of the shutter, due to its inertia, resulting in the alignment of the openings 81 and 80 during a part of the period when the lens is moving with the film.

In order to draw the objective out of engaging position when removing or inserting a film, a cord 98ª is secured to the enlarged end 74 of the casing, passing through a slot in a fork 98ᵇ and an opening in the outwardly turned end of a projecting tongue 98, being secured by a knot. The lens cell may be drawn outwardly by this cord and secured by engagement of a knot on the cord with fork 98ᵇ.

A shutter actuated by momentum, or inertia, in accordance with the invention, may be used in connection with means for projecting pictures as will readily be understood.

Although the present invention has been described in connection with the specific details of an embodiment thereof, it is not intended that these details shall be regarded as limitations upon the scope of the invention, except in so far as included in the accompanying claims.

I claim:

1. In a moving picture machine, in combination, a lens cell, a weighted shutter intercepting the lens and movably secured thereto, and means for reciprocating the lens cell whereby the inertia of the shutter causes it to move with relation to the lens.

2. In a moving picture machine, in combination, a lens cell, a weighted shutter intercepting the lens movably secured thereto, means for normally holding the shutter in position to cover the lens, and means for reciprocating the lens cell whereby the inertia of the shutter causes it to move to uncover the lens.

3. In a moving picture machine, in combination, a lens cell provided at its front with an enlarged chamber, a weighted shutter movably mounted in said chamber before the lens cell, and means for reciprocating the lens cell whereby the inertia of the shutter causes it to move with relation to the lens.

4. In a moving picture machine, in combination, a lens cell provided at its front with an enlarged chamber, a weighted shutter movably mounted in said chamber before said lens cell, means for normally holding the shutter in position to cover the lens, and means for reciprocating the lens cell whereby the inertia of the shutter causes it to uncover the lens on movement of the lens cell in one direction.

5. In a moving picture machine, in combination, a lens cell provided at its front with an enlarged chamber, a weighted shutter pivotally mounted to intercept the lens, a spring tending to hold said shutter normally in lens-covering position, and means for reciprocating the lens cell whereby the inertia of the shutter causes it to uncover the lens on movement of the lens cell in one direction.

6. In a moving picture machine, in combination, a continuously moving film, a reciprocable lens cell movable with said film for a predetermined distance, a weighted shutter before the lens cell and movably secured thereto, means for normally holding the shutter in position to cover the lens, and means for reciprocating the lens cell whereby the inertia of the shutter causes it to uncover the lens and permit exposure during the period of movement of the lens cell with the film.

7. In a moving picture machine, in combination, a continuously moving film, a reciprocable lens cell movable with said film for a predetermined distance, the lens cell being provided at its front with an enlarged chamber, a weighted shutter movably mounted in said chamber, means for normally holding the shutter in position to cover the lens, and means for reciprocating the lens cell whereby the inertia of the shutter causes it to uncover the lens and permit exposure during the period of movement of the lens cell with the film.

8. In a moving picture machine, a continuously moving film, a reciprocable lens cell movable with said film for a predetermined distance, said lens cell being provided at its front with an enlarged chamber, a weighted shutter pivotally mounted on said chamber, a spring tending to hold said shutter normally in lens-covering position, and means for reciprocating the lens cell whereby the inertia of the shutter causes it to uncover the lens and permit exposure during the period of movement of the lens cell with the film.

9. In a moving picture machine, in combination, a continuously moving film provided with regularly disposed engaging projections, a movable lens cell having means adapted to engage said projections to cause movement of the lens cell and a weighted shutter before the lens cell and movably secured thereto whereby its inertia causes relative movement of the shutter with respect to the lens on movement of the lens cell.

10. In a moving picture machine, in combination, a continuously moving film provided with engaging projections regularly disposed thereupon, a reciprocable lens cell having means adapted to engage said projections to cause movement of the lens cell with the film for a determined distance, means for returning the lens cell in the reverse direction, and a weighted shutter before the lens cell and movably secured thereto, whereby the inertia of the shutter causes it to move with relation to the lens.

11. In a moving picture machine, in combination, a continuously moving film provided with engaging projections regularly disposed thereupon, a reciprocable lens cell having means adapted to engage said projections for a determined distance to cause movement of the lens cell with the film for a determined distance, means for returning the lens cell in the reverse direction, a weighted shutter before the lens cell and movably secured thereto, and means for normally holding the shutter in position to cover the lens whereby the inertia of the weighted shutter causes it to uncover the lens and permit exposure during movement of the lens cell with the film.

12. In a moving picture machine, in combination, a continuously moving film provided with engaging projections regularly disposed thereupon, a reciprocable lens cell having means adapted to engage said projections for a determined distance to cause movement of the lens cell with the film for a determined distance, means for returning the lens cell in the reverse direction, the lens cell being provided with an enlarged chamber at its front, a weighted shutter movably secured in said enlarged chamber, and means for normally holding the shutter in position to cover the lens, whereby on return movement of the lens cell the inertia of the shutter causes it to uncover the lens to permit exposure during the next forward movement.

13. In a moving picture machine, in combination, a continuously moving film provided with engaging projections regularly disposed thereupon, a reciprocable lens cell having means adapted to engage said projections for a determined distance to cause movement of the lens cell with the film for a determined distance, means for returning the lens cell in the reverse direction, the lens cell being provided with an enlarged chamber at its front, a weighted shutter pivotally mounted in said chamber, and a spring tending to hold said shutter normally in lens-covering position, the inertia of the shutter serving to uncover the lens and permit exposure during the next movement of the lens cell with the film.

14. In a moving picture machine, in combination, a disk film provided with engaging projections disposed in a spiral, means for continuously rotating the disk, a movable lens cell having means adapted to engage said projections to cause movement of the lens with the disk film, means for returning the lens cell in a reverse direction, means for moving the lens cell transversely across the disk to follow the spiral thereon, and a weighted shutter before the lens and movably secured thereto whereby its inertia causes movement of the shutter to uncover the lens and permit exposure while the lens cell moves forward with the disk film.

15. In a moving picture machine, in combination, a continuously moving film provided with engaging projections regularly disposed thereupon, a reciprocable lens cell having means adapted to engage said projections for a determined distance to cause movement of the lens cell with the film for a determined distance, means for returning the lens cell in the reverse direction, and a weighted shutter pivotally mounted before the lens and movable therewith, means for normally holding the shutter in position to cover the lens, the rearward momentum of the shutter causing it to uncover the lens and permit exposure during the period of movement of the lens cell with the film.

HENRY K. SANDELL.